US006698655B2

United States Patent
Kondo et al.

(10) Patent No.: US 6,698,655 B2
(45) Date of Patent: Mar. 2, 2004

(54) SUPER CROSS-DOCK LOGISTICS SYSTEM AND METHOD

(75) Inventors: Ted Kondo, Marysville, OH (US); Masayuki Tamai, Dublin, OH (US); Neil Vining, Ostrander, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/394,294

(22) Filed: Mar. 21, 2003

(65) Prior Publication Data

US 2003/0178481 A1 Sep. 25, 2003

Related U.S. Application Data

(60) Continuation of application No. 10/032,718, filed on Dec. 28, 2001, which is a division of application No. 09/613,643, filed on Jul. 11, 2003, now abandoned.

(51) Int. Cl.[7] .............................................. G06K 17/00
(52) U.S. Cl. ........................................ 235/385; 235/375
(58) Field of Search ................................. 235/375, 385

(56) References Cited

U.S. PATENT DOCUMENTS 5,472,309 A   * 12/1995   Bernard et al. ............. 235/375

* cited by examiner

Primary Examiner—Harold I. Pitts
(74) Attorney, Agent, or Firm—Alan T. McDonald; Vince Ciamacco; Standley Law Group LLP

(57) ABSTRACT

A system and method is disclosed for ordering, receiving, staging, and delivering supplies to assembly line locations in an assembly plant. Cross-dock and staging functions are combined at one facility—a super cross-dock—so that suppliers to a large-scale manufacturer with multiple assembly plants may make deliveries of supplies to a single facility that services the multiple assembly plants. Supplies from multiple suppliers are received at the super cross-dock and staged for distribution to the assembly plants that comprise a manufacturing operation. Supply order requests are submitted from assembly plant computer systems that consolidate the orders before submitting an order to a supplier. Orders are consolidated based on when supplies are required at the various assembly plants. A bar code labeling system at the suppliers supports the super cross-dock inventory and distribution of supplies according to delivery time and assembly plant.

20 Claims, 7 Drawing Sheets

SUPER CROSS-DOCK LOGISTICS SYSTEM AND METHOD

CROSS REFERENCE TO RELATED APPLICATIONS

This application is a continuation of U.S. patent application Ser. No. 10/032,718, filed Dec. 28, 2001 entitled "SUPER CROSS-DOCK LOGISTICS SYSTEM AND METHOD" which is a divisional of U.S. patent application Ser. No. 09/613,643, filed Jul. 11, 2000 entitled "SUPER CROSS-DOCK LOGISTICS SYSTEM AND METHOD," now abandoned.

TECHNICAL FIELD

The present invention relates to distribution logistics for supplies in an assembly plant. More particularly, the present invention relates to a system and method for ordering, receiving, staging, and delivering supplies to assembly line locations in an assembly plant.

BACKGROUND OF THE INVENTION

Many manufacturers, such as automobile manufacturers, operate several assembly plants that require common supplies. For each assembly plant, supplies from various suppliers are often received at the assembly plant directly from the supplier. Once supplies are received from the various suppliers, they are staged for delivery to one or more assembly line locations within the assembly plant so they may be used in a manufacturing process.

Receiving supplies directly from a supplier at an assembly plant can be costly to a manufacturer. Suppliers that deliver supplies to more than one assembly plant must make a stopover at each plant to unload the supplies. Each stopover can add cost to the manufacturer. The manufacturer's costs may be reduced significantly if the number of stopovers each of the suppliers makes is reduced.

Some manufacturers have attempted to reduce stopovers by having suppliers deliver supplies to a cross-dock, warehouse, or similar type of facility. Supplies that are received at a cross-dock, warehouse, or other facility are then distributed to one or more assembly plants. While the use of such facilities reduces the number of stopovers made by suppliers, the manufacturer still maintains an inventory of supplies at the facility. Instead of storing or housing supplies at the assembly plants, they are stored at the facility.

As noted above, a manufacturer incurs costs whether supplies are delivered and stored at assembly plants or an intermediate facility. Staging at the assembly plant can also be costly to a manufacturer. Significant resources such as plant space and manpower are necessary to complete the staging process. The manufacturer's costs may be reduced significantly if the staging can be completed at a facility other than the assembly plant.

U.S. Pat. No. 5,528,489 to Asahara discloses a uniformalized method for delivering parts within an assembly plant. U.S. Pat. No. 5,568,393 to Ando discloses a controller for loading and unloading goods from pallets in a storehouse. Both patents address problems related to delivering parts within a location. The references do not address problems related to the receipt of supplies from multiple suppliers and the delivery of supplies to multiple assembly plant locations.

U.S. Pat. No. 5,631,827 to Nicholls discloses a management tool that supports automated order processing, packing, shipping, and transportation of goods. The Nicholls tool may be used for many different types of logistics management models. The reference does not address any problems related to ordering, receiving, staging, or delivering of supplies.

U.S. Pat. No. 6,006,196 to Feigin discloses a method for using distribution resource planning logic for providing estimates of inventory. The reference discloses mathematical algorithms for calculating inventory and replenishment requirements. The reference does not address problems related to staging and delivering of supplies.

SUMMARY OF THE INVENTION

The present invention is a system and method for ordering, receiving, staging, and delivering supplies to assembly line locations in assembly plants. Cross-dock and staging functions are combined at one facility—a super cross-dock—so that suppliers to a large-scale manufacturer with multiple assembly plants may make deliveries of supplies to a single facility that services the multiple assembly plants.

The super cross-dock of the present invention is a facility in which supplies from multiple suppliers are stored for a short time (less than one day) for distribution to the assembly plants that comprise a manufacturing operation. Supplies are received at the super cross-dock from multiple suppliers and then staged for delivery to assembly plants based on supply order requests submitted from the assembly plants to a computer system at the super cross-dock. This is done at the time of delivery scheduled to suppliers. The super cross-dock delivers parts according to the plan. A bar code labeling system at the supplier supports the distribution of supplies from the super cross-dock. Bar code labels that identify receiving time, dock number, and assembly line location at an assembly plant are placed on the supplies delivered by the supplier. Supplies are then staged and delivered to the assembly plants based on the supply order request's time and location as noted on the label.

The bar code labeling system supports the staging operations that occur at the super cross-dock. Supplies are not stored by part number. Instead, they are organized according to delivery time and assembly line location. Each assembly plant serviced by a super cross-dock has its own staging area at the super cross-dock. As supplies are received at the super cross-dock, they are moved to a particular assembly plant area according to label information and then moved to the staging area for the assembly plant by time and location. Deliveries to the various assembly plants are made from the staging areas. Deliveries may occur throughout the day depending upon the requirements of the assembly plants.

The system of the present invention comprises a plurality of computers and software components that support the super cross-dock and staging functions. In accordance with the present invention, incoming supply orders are received at the super cross-dock computer system from each of a plurality of assembly plants that belong to a manufacturing operation. Incoming supply orders from all of the assembly plants may be held and analyzed to determine an appropriate time for submitting an outgoing supply order to a supplier.

Once the criteria for placing an outgoing supply order have been met, an outgoing supply order is submitted to the supplier. The timing of shipments from suppliers to delivery at assembly plants is coordinated. The supplies are received from the supplier at the super cross-dock. The supplies are labeled by the supplier with a bar code that identifies a delivery time, assembly plant line location, dock number, super cross-dock location, and production number. Other identifying information may be included on the label as well. The supplies are then staged for delivery to the appropriate assembly plant at an appropriate time and assembly plant line location. Supplies may be delivered from the super cross-dock to the assembly plants throughout the day depending on the production requirements of each of the assembly plants.

The present invention reduces significantly the stopover charges that result when a single supplier is required to make deliveries to multiple assembly plants. Supplies are received at one facility and then distributed to the various assembly plants that require them. Stopovers are also reduced due to increased efficiency in placing orders with a particular supplier.

The present invention also reduces the costs involved in staging supplies for use on an assembly line. Because the staging is completed at the facility according to the assembly plant's needs as indicated on a label, assembly plant space and manpower requirements are reduced, due to the fact that parts are delivered to the specific assembly plant at the specific time.

DESCRIPTION OF EXAMPLE EMBODIMENTS

Figure 1:
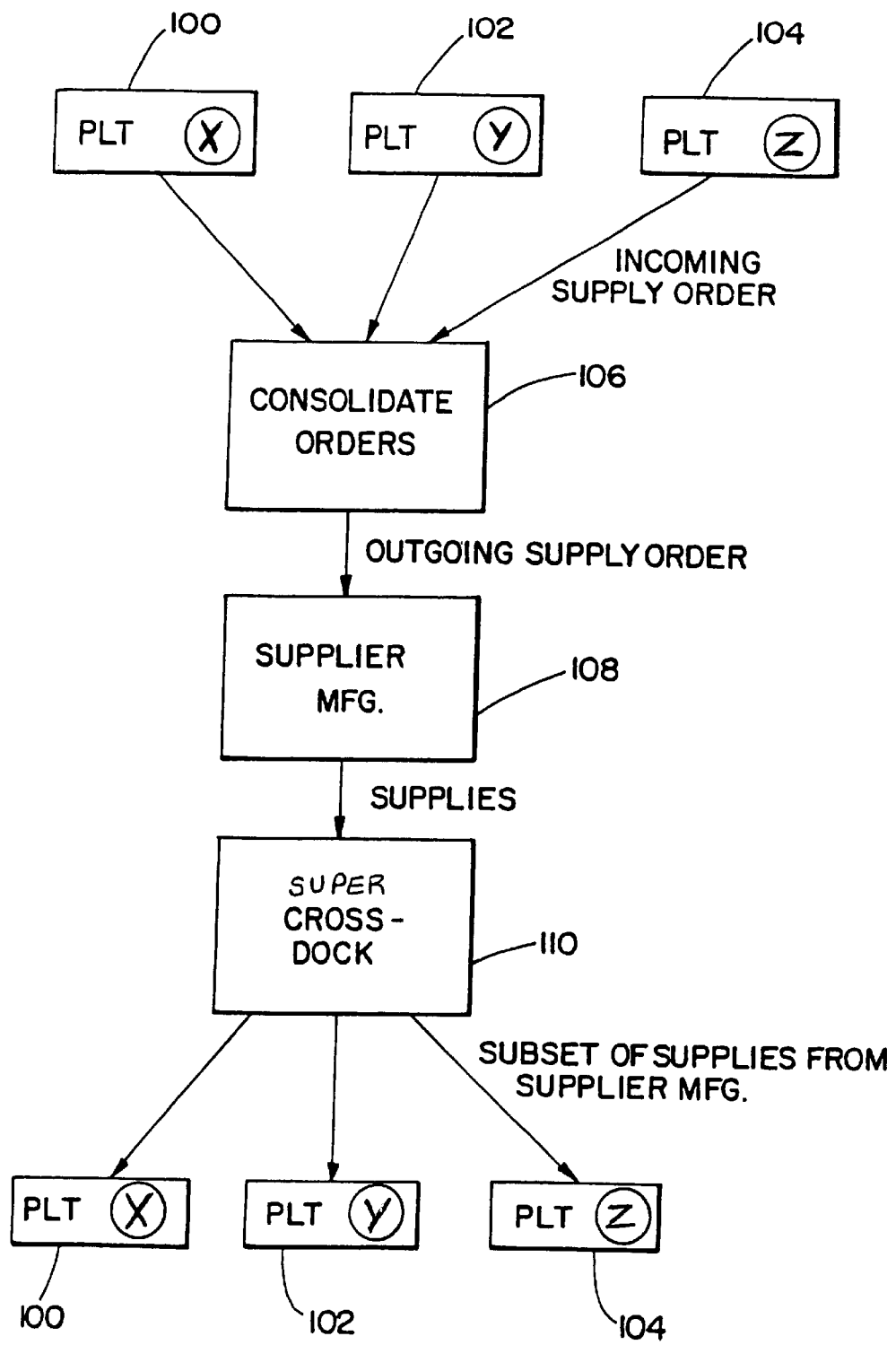
FIG. 1 is a schematic diagram showing the ordering, receiving, and delivering of supplies according to the invention.

Referring to FIG. 1, a schematic diagram showing the ordering, receiving, and delivering of supplies according to the invention is shown. A large-scale manufacturing operation may comprise a plurality of assembly plants such as PLT X 100, PLT Y 102, and PLT Z 104. Each of the assembly plants may have its own requirements for supplies depending upon its production capacity and other factors. As supplies are needed, each of the assembly plants submits a supply order request to an order consolidation process 106. Orders from the various assembly plants are consolidated and held until certain criteria for submitting an order once a day with desired time, quantity, and assembly plant line location are met. Suppliers receive one order consolidating requirements for all assembly plants. Normally, suppliers are asked to provide supplies for two to three days. However, suppliers may be asked to meet an immediate demand at any time. Various criteria may be used for changing orders.

When the criteria for submitting an order to a supplier have been met, an outgoing supply delivery order is sent to the supplier 108. The outgoing supply order may reflect several incoming supply orders that were placed by the various assembly plants. Once the supplier 108 has manufactured the supply, it is delivered to the super cross-dock 110 that services the assembly plants. After arrival at the super cross-dock 110, the supplies from the supplier manufacturer 108 are staged for delivery to the assembly plants PLT X 100, PLT Y 102, and PLT Z 104. Supplies are not stored at the super cross-dock nor do they have specific storage areas. Instead, supplies are staged according to the time they will be needed at an assembly plant and an assembly plant line location. Each of the assembly plants may receive a subset of the supplies that were delivered to the super cross-dock 110 by the supplier manufacturer 108. Supplies are transported from the super cross-dock to the assembly plants using trucks, vans, railroad cars, or any type of vehicle or transporter appropriate for moving the supplies from the super cross-dock.

Figure 2:
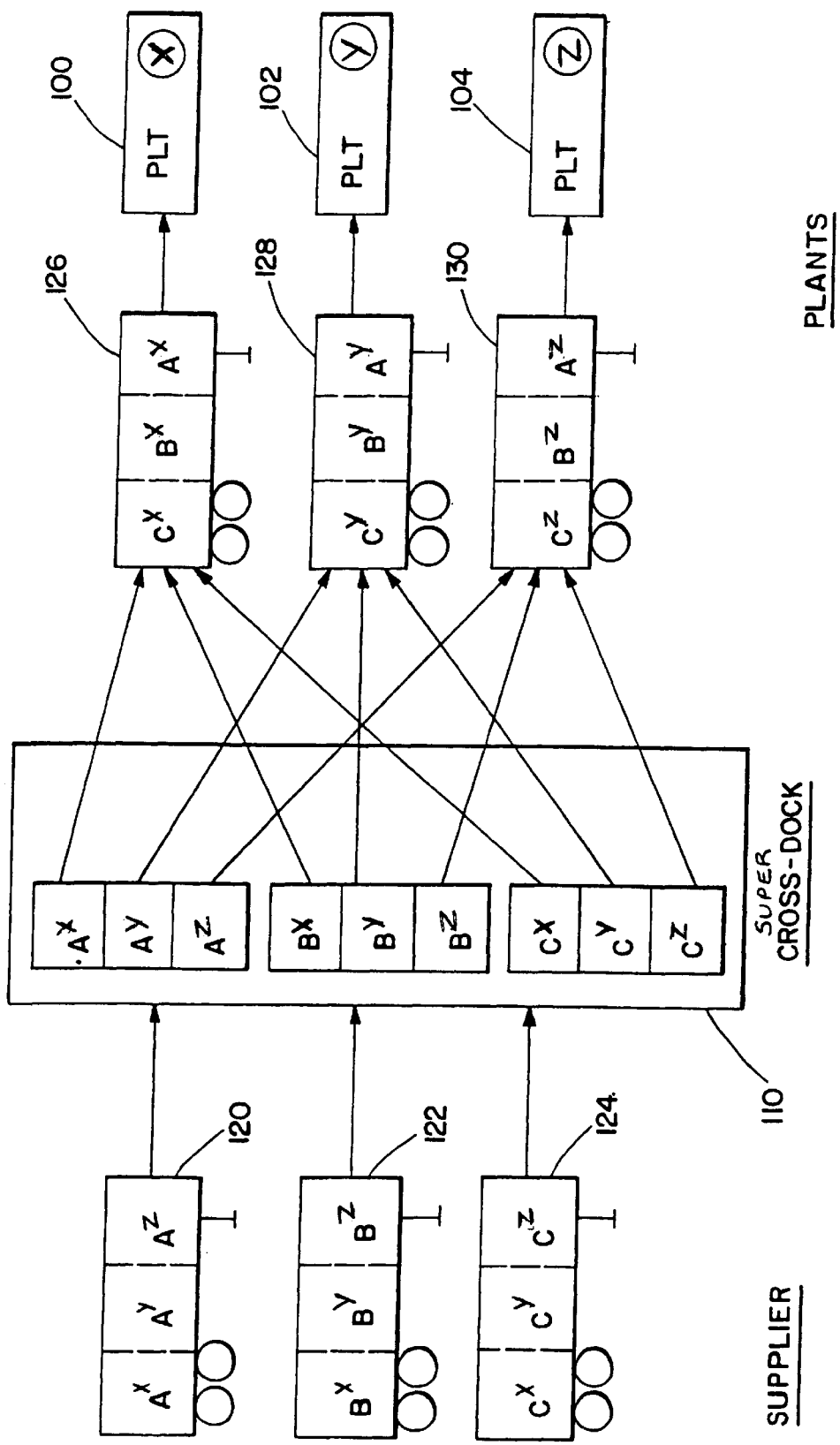
FIG. 2 is a schematic diagram showing the receiving and delivering of supplies according to the invention.

Referring to FIG. 2, a schematic diagram showing the receiving and delivering of supplies according to the invention is shown. As shown in FIG. 2, the super cross-dock may receive supplies from a plurality of supplier trucks 120, 122, 124 and may service a plurality of assembly plants. PLT X 100, PLT Y 102, and PLT Z 104. Each supplier truck 120, 122, 124 may contain an entire truckload of a particular part. For example, supplier truck 120 may contain part A, supplier truck 122 may contain part B, and supplier truck 124 may contain part C. Each of the supplier trucks 120, 122, 124 delivers its entire contents to the super cross-dock 110. The supplier trucks are unloaded at the super cross-dock 110 and arrangements are made to deliver supplies from each of the supplier trucks to each of the assembly plants 100, 102, 104 serviced by the super cross-dock 110. For example, one truck 126 may deliver supplies from the three suppliers 120, 122, 124 to PLT X 100 at specified time. A second truck 128 may deliver supplies from the three suppliers 120, 122, 124 to PLT Y 102 at a specified time and a third truck 130 may deliver supplies from the three suppliers 120, 122, 124 to PLT Z 104 at a specified time. Depending on each plant's production requirements, supplies may be delivered from the super cross-dock to the assembly plant many times during the day. Transporters such as trucks, vans, railroad cars, etc. may be used to deliver supplies from the super cross-dock to an assembly plant.

Figure 3:
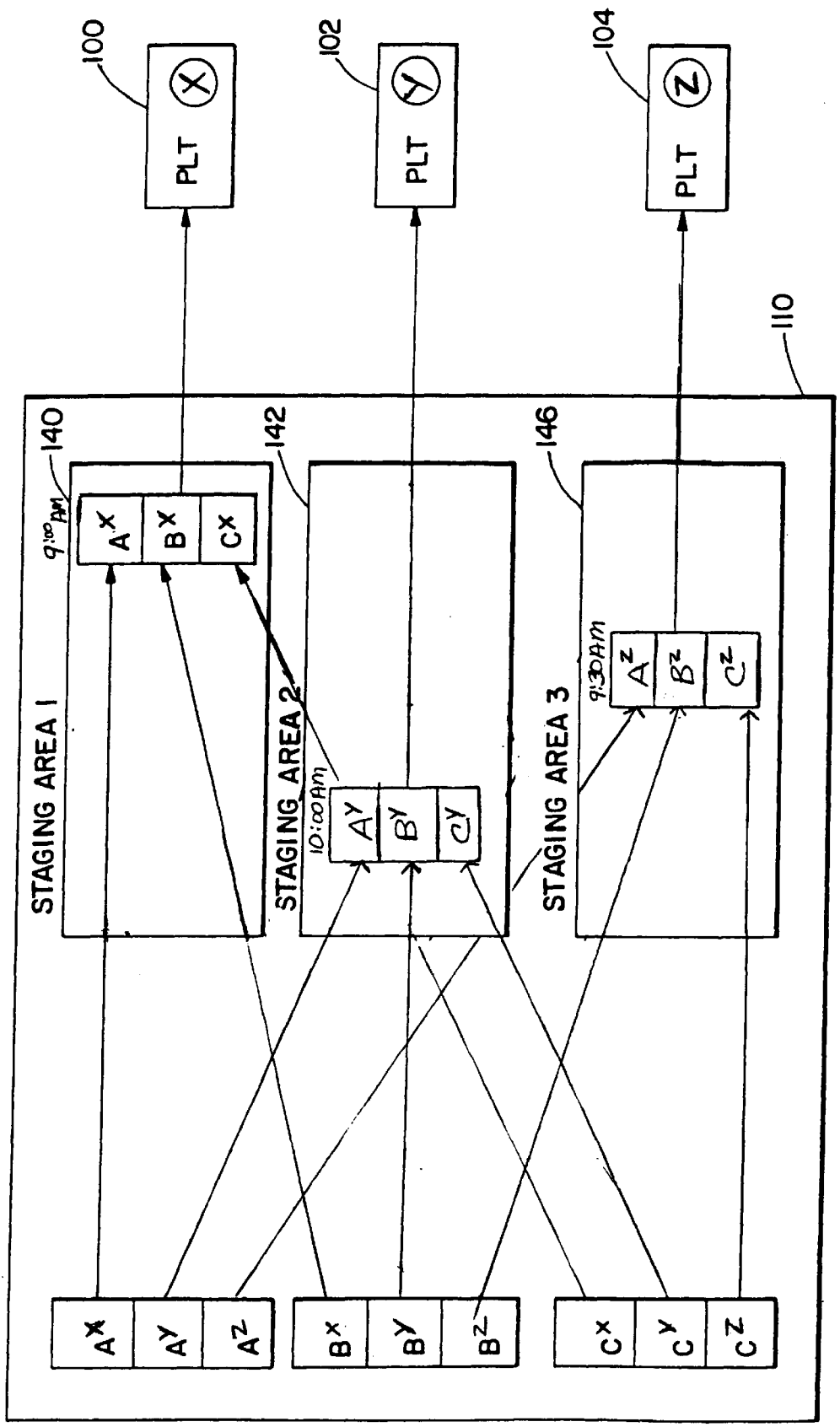
FIG. 3 is a schematic diagram showing the receiving, staging, and delivering of supplies according to the invention.

Referring to FIG. 3, a schematic diagram showing the receiving, staging, and delivering of supplies according to the invention is shown. As shown in FIG. 3, supplies from each of three different suppliers may be unloaded and stored at the super cross-dock 110. The super cross-dock 100 may receive supplies from one supplier truck that are needed by each of the assembly plants serviced by the super cross-dock (e.g., $A^x A^y A^z$). The super cross-dock comprises staging areas so that supplies from each of the supplier trucks may be organized and prepared for use at an assembly plant serviced by the super cross-dock. Staging area 1 140 may be used to service PLT X 100, staging area 2 may be used to service PLT Y 102, and staging area 3 may be used to service PLT Z 104. Within each staging area, supplies from the supplier trucks (e.g., A, B, and C) that have delivered to the super cross-dock are organized and prepared for transport to the respective assembly plants 100, 102, 104 as indicated by a delivery time (e.g., 9:00 a.m. to PLT X 100, 10:00 a.m. to PLT Y 102, and 9:30 a.m. to PLT Z 104). Each transporter (e.g., truck, car, van, or other vehicle) that services an assembly plant from the super cross-dock 100, therefore, has supplies from multiple suppliers. Stopovers by the supplier trucks are reduced because each supplier truck stops once at the super cross-dock rather than at each assembly plant that needs the supplier's parts.

Figure 4:
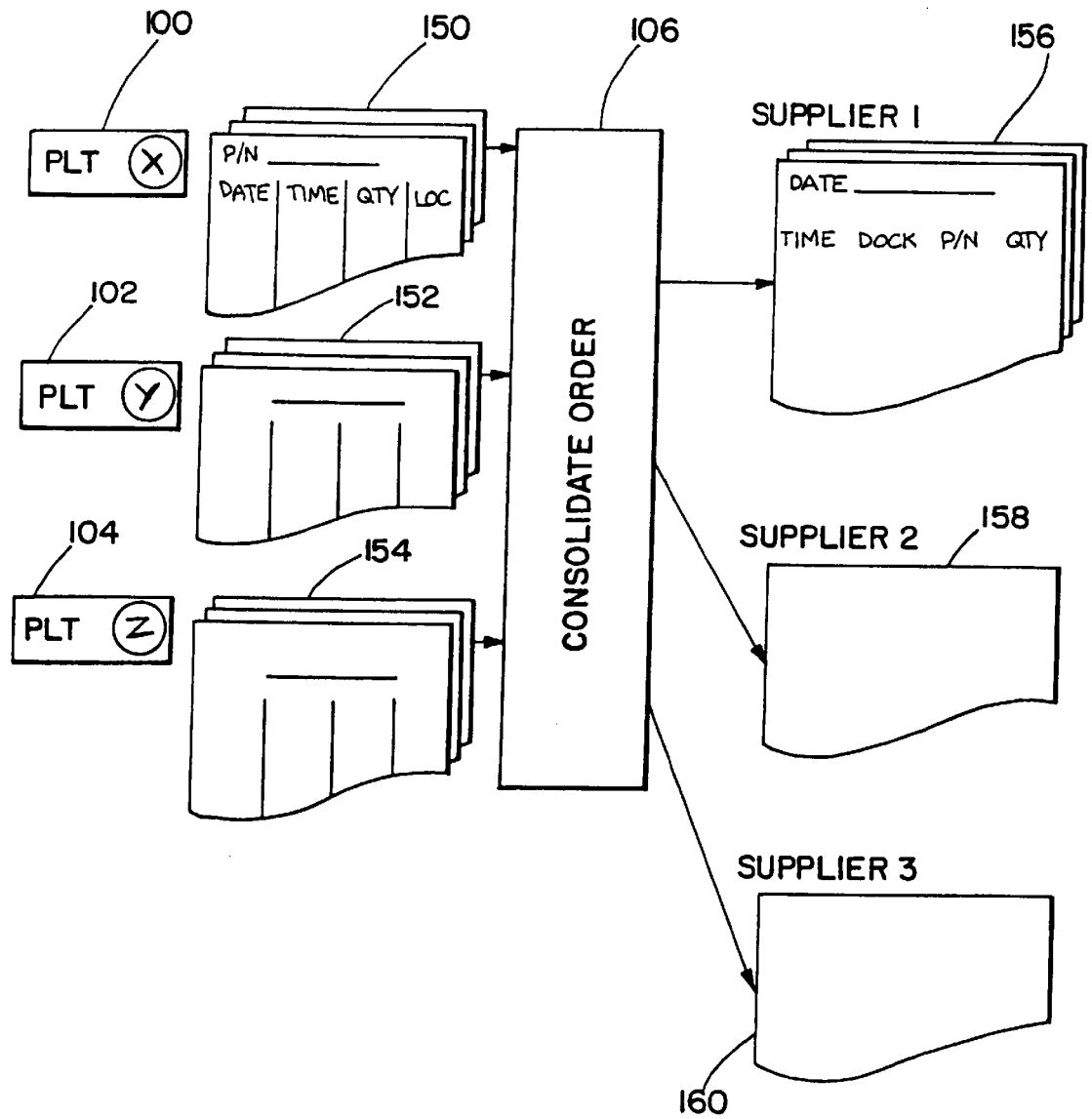
FIG. 4 is a schematic diagram showing the ordering of supplies according to the invention.

Referring to FIG. 4, a schematic diagram showing the ordering of supplies according to the invention is shown.

Each assembly plant PLT X 100, PLT Y 102, PLT Z 104, submits orders for the supplies that are needed at the plant. The supply order requests are received at an order consolidation process or system 106. For example, PLT X 100 may submit orders 150 to the consolidate order process 106, PLT Y 102 may submit orders 152 to the consolidate order process 106, and PLT Z 104 may submit orders to the consolidate order process 106. In many instances, the assembly plants need the same supplies. The consolidate order process or system 106 examines the incoming supply order requests 150, 152, 154 to determine when the orders should be submitted to a supplier 156, 158, 160. Orders are submitted to a supplier based on when the supplies are needed at the assembly plants. Orders are placed so that supplies arrive at the super cross-dock in time to be unloaded, staged, and transported to the various assembly plants to be used in production. Because supplies are ordered based on when they are likely to be used, they spend only a short time at the super cross-dock before being transported to an assembly plant. Some may be transported to an assembly plant within minutes of arriving at the super cross-dock while others may be transported within hours. As a result, the manufacturer is not required to maintain an inventory of supplies.

Also as shown in FIG. 4, an order submitted to a supplier 156 identifies a super cross-dock facility 162 to which the supplies are to be delivered. The facility identifier for the super cross-dock may be an alphanumeric string, number, letter, etc. that identifies the super cross-dock to which the supplies are to be delivered. Because supplies are delivered to one location—the super cross-dock—the supplier is not required to prepare or load the truck for multiple stops. The manufacturer may benefit from any additional cost-savings realized by the supplier. In order to utilize truck space efficiently, orders from assembly plants are consolidated by timing. Orders are placed with the suppliers based on when the supplies are needed at each of the assembly plants. The timing requirements as well as super cross-dock and assembly line location information is included on the labels that the supplier places on each order. The information on the supply labels is then used in staging the supplies at the super cross-dock based on time of delivery to the assembly plants and assembly line location. For example, some supplies may be labeled for delivery at 9:00 a.m. to PLT X while other supplies may be labeled for delivery at 10:00 a.m. to PLT Y.

Figure 5:
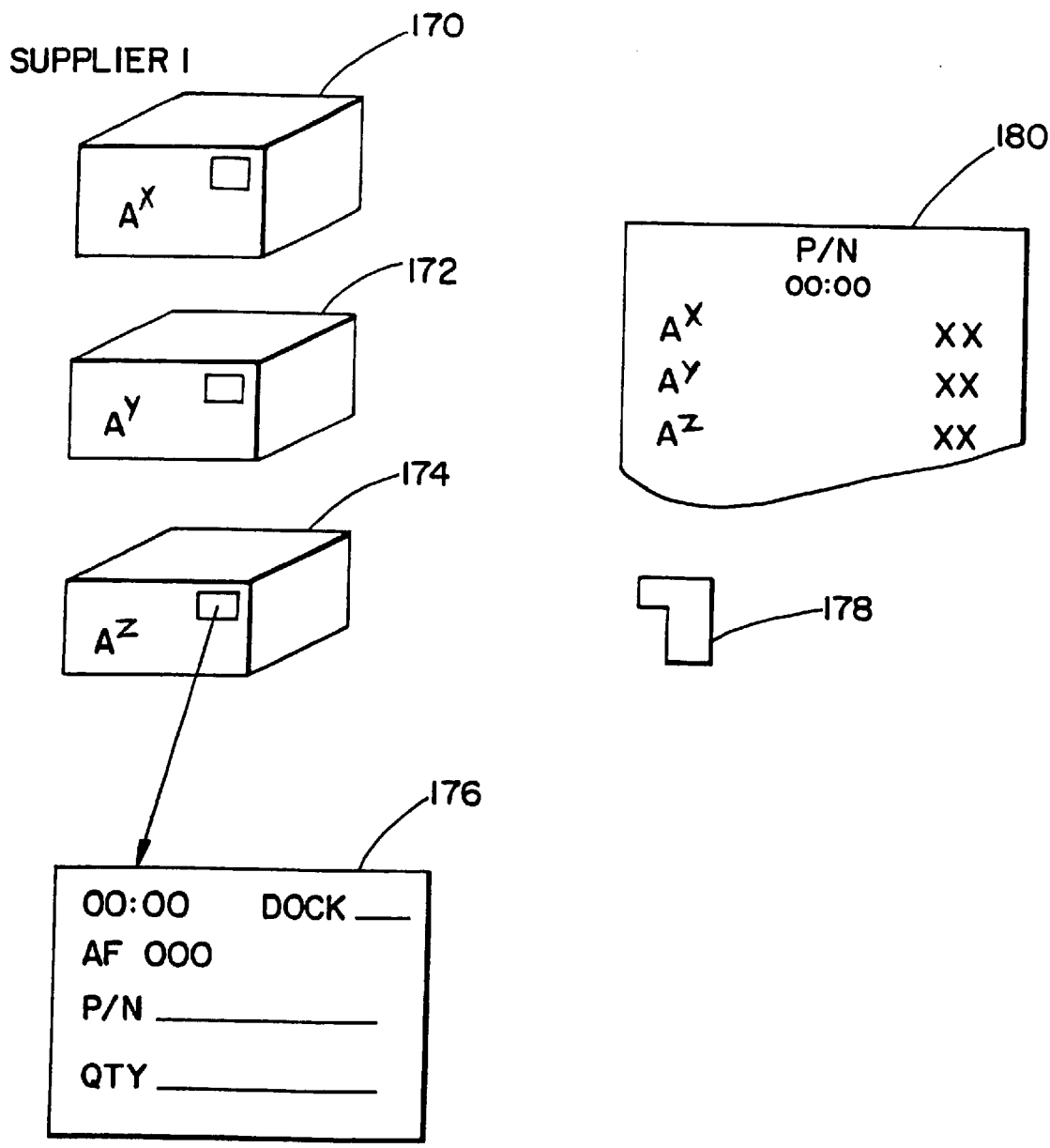
FIG. 5 is a schematic diagram showing the labeling of supplies according to the invention.

Referring to FIG. 5, a schematic diagram showing the labeling of supplies according to the invention is shown. Labels with all the information are placed on the supply containers at the suppliers. When supplies are received at a super cross-dock, they are prepared for delivery to the assembly plants that are serviced by the super cross-dock. The preparations include staging for delivery at a specific time and super cross-dock number for delivery to an assembly plant. As shown in FIG. 5, supplies from a single supplier (e.g., Supplier 1) may be staged and labeled for delivery to three assembly plants. Instructions for staging and labeling of the supplies may be identified on an instruction sheet 180 that indicates how the entire shipment from the supplier is to be allocated. For example, a first portion of the shipment from supplier 1 may go to PLT X 170, a second portion of the shipment from supplier 1 may go to PLT Y 172, and a third portion of the shipment from supplier 1 may go to PLT Z 174. Each portion of the supplies 170, 172, 174 may have a bar code label 176 for tracking and distribution. The bar code label 176 may identify the super cross-dock to which the supplies are to be delivered, an assembly line location at which the supplies are to be used, and the time the supplies are needed at the assembly line location. Once the supplies are delivered to the super cross-dock, the bar code labels for the supplies may be read using a bar code scanner 178. The supplies are then staged according to the time the supplies are required at the assembly line location. Bar code labels may be one-dimensional or two-dimensional. Two-dimensional bar code labels allow for a significant amount of information to be stored on each label. Furthermore, two-dimensional bar code labels give the supplier more room for marking the supplies with super cross-dock, time of delivery to manufacturing plant dock number, and assembly line location information.

Figure 6:
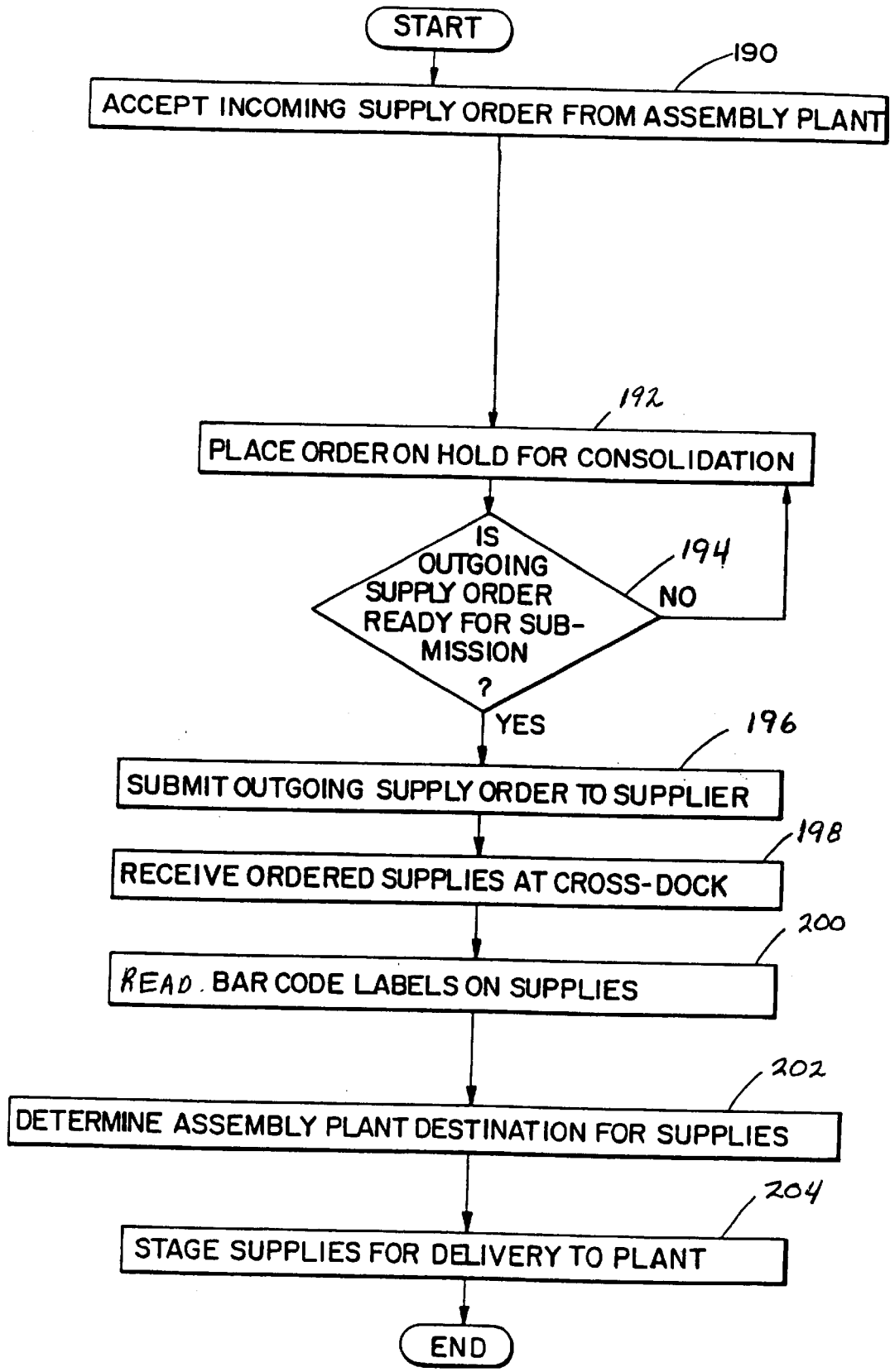
FIG. 6 is a flow chart illustrating the primary steps according to the invention.

Referring to FIG. 6, a flow chart illustrating the primary steps according to the invention is shown. In the first step 190, incoming supply orders from assembly plants serviced by the super cross-dock are processed. In step 192, the orders are held for consolidation. In the next step 194, incoming supply orders that have been held are examined to determine if an outgoing supply order should be submitted to a supplier. An order is placed with a supplier based on when the supplies are needed at the various assembly plants that may be serviced by a super cross-dock. Based on when the supplies are needed and taking into account the time required for the supplier to package and ship the supplies, orders are placed so that the supplies may be received shortly before they are needed. Typically, an order is placed once a day with desired time, quantity, and assembly plant line location information included as part of the order. This information is used by the supplier in creating and placing labels on the supplies. Once the criteria for placing the order have been met, the outgoing supply order is submitted to the supplier 196. Using data in the supply order, the supplier labels the supplies with information regarding the delivery time to the assembly plant and assembly plant line location prior to shipping the supplies.

In the next step 198, the ordered supplies are received from the supplier at the super cross-dock. The supplier truck makes one stop at the super cross-dock that may service several assembly plants. Next, the supplies are prepared for delivery to the assembly plants. In step 200, bar code labels that have been placed on the supplies by the supplier are read to identify the supplies' delivery times and super cross-dock numbers. The bar code label may further identify the assembly plant destination, including the assembly line location, for the supplies 202. Finally, the supplies are staged at the super cross-dock for delivery to the assembly plants 204. A transporter such as a truck, van, railroad car, automobile, etc. may be used to move supplies from the super cross-dock staging areas to the assembly plants.

Figure 7:
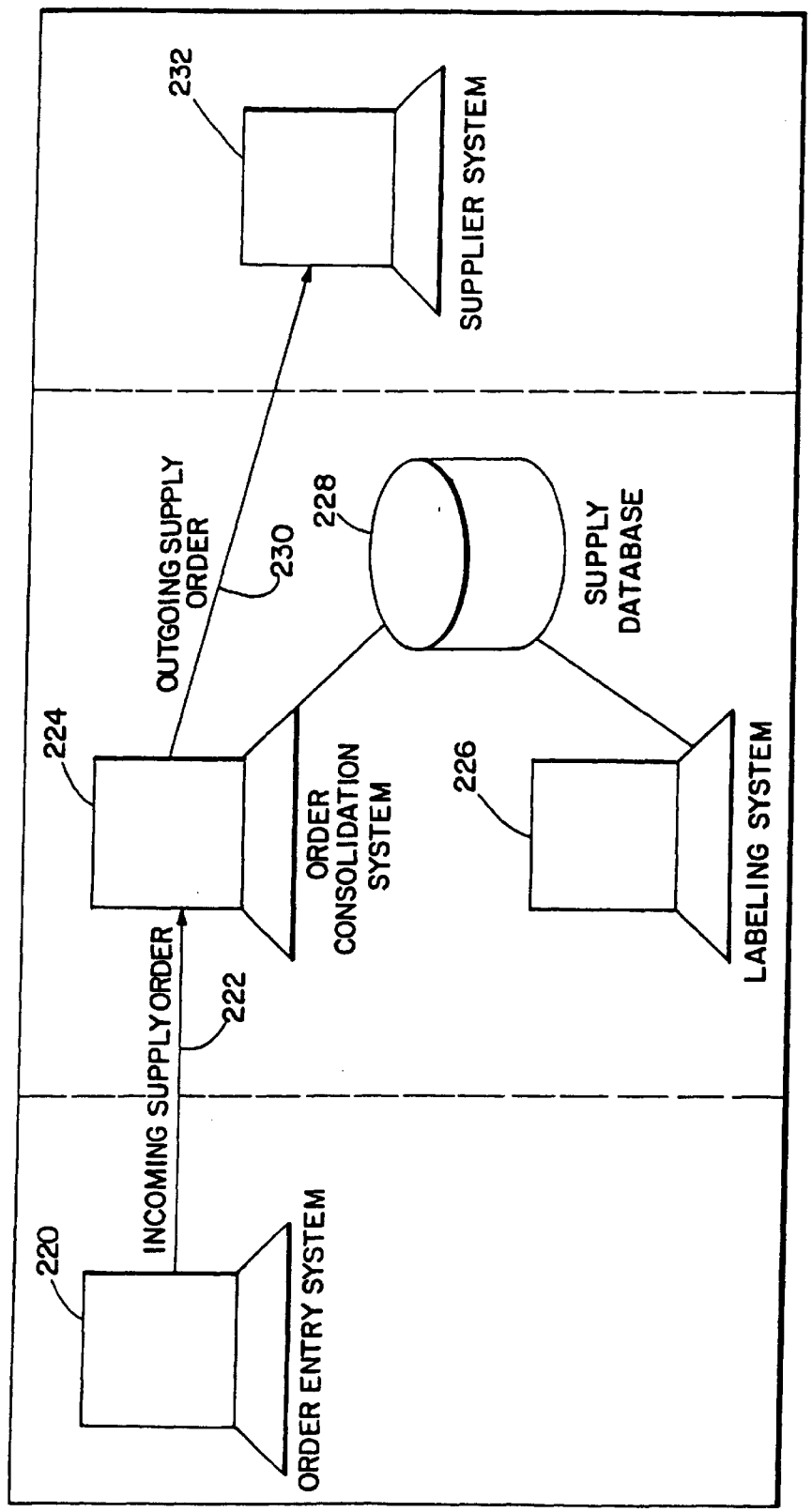
FIG. 7 is a schematic diagram of computer systems to support ordering, receiving, staging, and delivering of supplies according to the invention.

Referring to FIG. 7, a schematic diagram of computer systems to support ordering, receiving, staging, and delivering of supplies according to the invention is shown. As shown in FIG. 7, several computer systems may be used to provide the features and functionality of the present invention. In an example embodiment of the present invention, computer systems at an assembly plant, super cross-dock, and supplier communicate to support the process of the invention. Each assembly plant supported by a super cross-dock has an order entry system 220 for submitting supply orders 222 to a super cross-dock order consolidation system 224. As explained previously, incoming supply orders 222 from multiple assembly plant order entry systems 220 are consolidated and held at the order consolidation system 224 until certain criteria for placing an order with a supplier are met. Communication links between the assembly plant order entry system 220 and order consolidation system 224 and the order consolidation system 224 and supplier system 232 facilitate the exchange of information between the computer systems. The communication links may be modem connections, direct telephone line connections, cable connections, etc.

Supply information, including inventory information, may be kept at a supply database 228. Information regarding supplies received at the super cross-dock from suppliers and distributed from the super cross-dock to the assembly plants may be tracked through the supply database 228. The supply database 228 may operate with a labeling system 226 that is used to read bar code labels for the incoming supplies. Supplies that are destined for each of the assembly plants serviced by the super cross-dock may be labeled with bar codes by the supplier so that they can be tracked using bar code scanners at various locations in the super cross-dock.

INDUSTRIAL APPLICABILITY

The present invention assists a large-scale, multiple assembly plants manufacturing operation in using super cross-dock and staging functions to reduce stopover charges of a single supplier to multiple assembly plants. For manufacturers that use many suppliers and require frequent deliveries of supplies, the cost savings can be significant.

While particular embodiments of the invention have been illustrated and described, various modifications and combinations can be made without departing from the spirit and scope of the invention, and all such modifications, combinations, and equivalents are intended to be covered and claimed.

What is claimed is:

1. A system for delivering supplies to a plurality of assembly plants for a manufacturer, comprising:
    an order entry computer for entering supply order requests for supplies to be delivered to each of said plurality of assembly plants of said manufacturer;
    an order consolidation computer for accepting and consolidating said supply order requests from said order entry computers, each of said consolidated supply orders comprising a delivery time determined in accordance with production schedules for said plurality of assembly plants;
    a plurality of supplier computers for a plurality of suppliers to said manufacturer, each of said plurality of supplier computers adapted to receive consolidated supply orders for supplies to be delivered by said plurality of suppliers to said plurality of assembly plants;
    a communication link at said order consolidation computer for transmitting consolidated supply orders to said plurality of supplier computers;
    a facility for receiving from said plurality of suppliers to said manufacturer supplies requested in the consolidated supply orders;
    a plurality of staging areas at said facility for staging supplies received at said facility according to said delivery times; and
    a transporter for transporting supplies from said staging areas to the assembly plants according to said delivery times.

2. The system of claim 1 wherein the order consolidation computer compares supply order requests against criteria for transmitting a consolidated supply order related to production schedules for said plurality of assembly plants.

3. The system of claim 2 wherein said criteria for transmitting a consolidated supply order comprises the production capacity of each of said assembly plants.

4. The system of claim 1 wherein the consolidated supply orders comprise a facility identifier.

5. The system of claim 1 further comprising a supply database for tracking information regarding supplies received at said facility and distributed from said facility to said plurality of assembly plants according to the production schedules for said assembly plants.

6. The system of claim 1 wherein supplies are staged at said facility according to bar code labels on said supplies.

7. The system of claim 1 wherein said bar code labels on said supplies are provided by said suppliers of the supplies.

8. A system for delivering supplies to a plurality of assembly plants of a manufacturer, comprising:
    an order consolidation computer for accepting incoming supply orders from said plurality of assembly plants of said manufacturer;
    a plurality of supplier computers for a plurality of suppliers to said manufacturer, each of said plurality of supplier computers adapted to receive consolidated supply orders for supplies to be delivered by said plurality of suppliers to said plurality of assembly plants;
    an order consolidation computer at said order consolidation computer for consolidating said incoming supply orders according to assembly plant delivery times and for transmitting outgoing supply orders to said plurality of supplier computers;
    supplies from said plurality of suppliers, said supplies requested in said outgoing supply orders;
    a bar code labeler for labeling said supplies with delivery times and staging area numbers according to production schedules for each of said plurality of assembly plants;
    a facility for receiving from said plurality of suppliers said supplies requested in said outgoing supply orders;
    a plurality of staging areas for staging said supplies from said plurality of suppliers by positioning said supplies at said facility for delivery to said plurality of assembly plants according to said delivery times and assembly plant line locations on said bar codes; and
    a transporter for transporting said supplies from said staging areas of said facility to the plurality of assembly plants.

9. The system of claim 8 wherein the order consolidation computer consolidates supply orders by comparing supply order requests against criteria for transmitting an outgoing supply order based on production schedules for said plurality of assembly plants.

10. The system of claim 9 wherein the order consolidation computer compares supply order requests against criteria for transmitting an outgoing supply order based on the production capacity of each of said plurality of assembly plants.

11. The system of claim 8 wherein said order consolidation computer submits outgoing supply orders to suppliers by submitting outgoing supply orders that comprise a facility identifier.

12. The system of claim 8 wherein said bar code labeler is further adapted to label supplies by placing quantities and production numbers on labels for the supplies.

13. The system of claim 8 wherein supplies are labeled at said suppliers to said manufacturer.

14. The system of claim 8 wherein said transporter is selected from the group consisting of trucks, vans, automobiles, and railroad cars.

15. A system for delivering supplies to a plurality of assembly plants of a manufacturer, comprising:

a first supply order from a first order entry computer at a first assembly plant for said manufacturer;

a second supply order from a second order entry computer at a second assembly plant for said manufacturer;

an order consolidation computer for accepting said first supply order and said second supply and consolidating said first and second supply orders according to first assembly plant delivery times and second assembly plant delivery times;

a first supplier computer of a first supplier to said manufacturer for receiving a first consolidated supply order;

a second supplier computer of a second supplier to said manufacturer for receiving a second consolidated supply order;

a facility for receiving supplies from said first supplier and supplies from said second supplier;

a first staging area for staging supplies from said first supplier and said second supplier for delivery to said first assembly plant by positioning said supplies according to said first assembly plant delivery times and assembly plant line locations; and a first transporter for transporting said staged supplies from said first staging area of said facility to said first assembly plant;

a second staging area for staging supplies from said first supplier and said second supplier for delivery to said second assembly plant by positioning said supplies according to said second assembly plant delivery times and assembly plant line locations; and a second transporter for transporting said staged supplies from said second staging area of said facility to said second assembly plant.

16. The system of claim 15 wherein said supplies from said first supplier and said supplies from said second supplier are labeled with said assembly plant delivery times and said assembly plant line locations.

17. The system of claim 16 wherein said supplies from said first supplier are labeled at said first supplier and said supplies from said second supplier are labeled at said second supplier.

18. The system of claim 17 wherein said supplies are labeled at the first supplier and the second supplier by further placing quantities and production numbers on the labels for the supplies.

19. The system of claim 15 wherein said order consolidation computer transmits consolidated supply orders to suppliers according to the time required for the suppliers to package and ship supplies to said facility.

20. The system of claim 15 wherein said first transporter and said second transporter are selected from the group consisting of trucks, vans, automobiles, and railroad cars.

* * * * *